US009344281B2

(12) United States Patent
Kobres et al.

(10) Patent No.: US 9,344,281 B2
(45) Date of Patent: May 17, 2016

(54) DETECTING FRAUD USING OPERATIONAL PARAMETERS FOR A PERIPHERAL

(71) Applicant: NCR Corporation, Duluth, GA (US)

(72) Inventors: Erick Christian Kobres, Lawrenceville, GA (US); Ron William Rogers, Suwanee, GA (US)

(73) Assignee: NCR Corporation, Duluth, GA (US)

( * ) Notice: Subject to any disclaimer, the term of this patent is extended or adjusted under 35 U.S.C. 154(b) by 142 days.

(21) Appl. No.: 13/838,105

(22) Filed: Mar. 15, 2013

(65) Prior Publication Data

US 2014/0281527 A1 Sep. 18, 2014

Related U.S. Application Data

(60) Provisional application No. 61/695,978, filed on Aug. 31, 2012, provisional application No. 61/720,645, filed on Oct. 31, 2012.

(51) Int. Cl.
*H04L 29/06* (2006.01)
*H04L 9/32* (2006.01)
*G06F 21/44* (2013.01)

(52) U.S. Cl.
CPC .............. *H04L 9/3239* (2013.01); *G06F 21/44* (2013.01); *H04L 2209/127* (2013.01)

(58) Field of Classification Search
None
See application file for complete search history.

(56) References Cited

U.S. PATENT DOCUMENTS

| 6,408,406 | B1 * | 6/2002 | Parris ............................... 714/41 |
| 7,004,385 | B1 * | 2/2006 | Douglass ...................... 235/379 |
| 2005/0235091 | A1 * | 10/2005 | Chen et al. .................... 710/313 |
| 2007/0209072 | A1 * | 9/2007 | Chen ............................... 726/16 |
| 2011/0055546 | A1 * | 3/2011 | Klassen et al. ............... 713/150 |
| 2011/0246756 | A1 * | 10/2011 | Smith et al. ....................... 713/2 |
| 2011/0259693 | A1 * | 10/2011 | Nascarella .................. 190/18 A |
| 2012/0099720 | A1 * | 4/2012 | Soundar ................... 379/265.02 |
| 2012/0192203 | A1 * | 7/2012 | Corry et al. .................... 719/312 |
| 2012/0331202 | A1 * | 12/2012 | Cohen ................... G06F 13/102 710/313 |

* cited by examiner

*Primary Examiner* — Harunur Rashid
*Assistant Examiner* — Andrew Steinle
(74) *Attorney, Agent, or Firm* — Harden E. Stevens, III; Schwegman, Lundberg & Woessner (57) ABSTRACT

A secure provisioning manifest used to authenticate and securely communicate with peripherals attached to a computer is provided with techniques to withdraw the authentication and terminate the secure communications with any peripheral when operating parameters for the peripheral indicate that there is a security threat associated with the peripheral. A secure I/O module, that is separate from an operating system and transaction software executed by a processor of the computer, uses the secure provisioning manifest to establish a secure encrypted session for communicating with each peripheral attached to the computer when a peripheral is authenticated and able to establish a secure encrypted session. The secure I/O module uses current and known operating parameters for each peripheral to periodically determine if a peripheral has been compromised by a security threat.

20 Claims, 7 Drawing Sheets

| SECURE PROVISIONING MANIFEST |
|---|
| 1. SECURE TRANSACTION SERVICE ID |
| 2. SECURE I/O MODULE ID |
| 3. ISSUE DATE |
| 4. EXPIRE DATE |
| 5. GRACE PERIOD |
| 6. POLICY RECORD SET 1 (PIN) |
| 7. POLICY RECORD SET 1 (PIN) |
| 8. POLICY RECORD SET 2 (STS) |
| 9. POLICY RECORD SET 3 (SCAN) |
| 10. POLICY RECORD SET 4 (MSR) |
| 11. POLICY RECORD SET 5 (NFC) |
| 12. POLICY RECORD SET 6 (NETWORK) |

| ID | PUBLIC KEY | VENDOR ID | PID | SERIAL NO. | POLICY SET |
|---|---|---|---|---|---|
| A456 | ************ | NCR | 5999 | ----- | PIN |
| S123 | ************ | NCR | 9800 | ----- | STS |
| A345 | ************ | NCR | 7899 | ----- | SCAN |
| A234 | ************ | NCR | 5949 | ----- | MSR |
| A567 | ************ | NCR | 1299 | ----- | NFC |

FIG. 6

DETECTING FRAUD USING OPERATIONAL PARAMETERS FOR A PERIPHERAL

CROSS-REFERENCE TO RELATED APPLICATIONS

This application claims the benefit of U.S. Provisional Application No. 61/695,978, filed Aug. 31, 2012 which is hereby incorporated by reference in its entirety. This application is also related to U.S. Provisional Application No. 61/720,645 titled "Security Module and Method of Securing Payment Information" having the same assignee as this application and which is also hereby incorporated by reference in its entirety. This application is further related to U.S. patent application Ser. No. 13/732,088 titled "A Secure Provisioning Manifest for Controlling Peripherals Attached to a Computer" having the same assignee as this application and which is hereby incorporated by reference in its entirety.

FIELD OF THE INVENTION

The present invention relates to computer terminals used to receive and process financial and/or sensitive information and more specifically to identifying fraud associated with a peripheral by using operational parameters for the peripheral.

BACKGROUND

Protecting financial and/or sensitive information including payment card data, personal identification numbers (PINs) and personal identification information from fraud and theft is a problem for many companies. The Payment Card Industry (PCI) is addressing some of the issues by providing security guidelines for payment peripherals that include card readers, keyboards containing card readers, and PIN entry devices. The PCI guidelines set minimum requirements for payment peripherals that include the use of encrypted data and management of encryption keys.

In addition to payment peripherals, there are other types of peripherals that are used to input valuable and/or sensitive information. For example, an optical code scanner can be used to read a barcode on a personal identification document that has sensitive personal information encoded in the barcode. In another example, a radio frequency identification (RFID) reader can be used to read an RFID chip located in a personal identification document or credit card that has sensitive financial or personal information.

Many standards and guidelines exist that govern how to identify and establish initial communications with peripherals that process valuable and/or sensitive information. However, there also currently exist numerous types of security attacks that seek to overcome these standards and guidelines and gain access to the information. Some of these attacks attach components to the inside and outside of the peripherals or to the communication cables used by the peripherals. These components monitor communications or data being transferred within the peripheral to capture sensitive information. Some attacks add malicious computer instructions to the peripherals that collect sensitive information. In most cases, the different attacks are transparent to the peripherals and to the operation of the peripherals making these types of attacks difficult to detect.

SUMMARY

Among its several aspects, the present invention seeks to overcome or ameliorate at least one of the disadvantages of the prior art, or to provide a useful alternative.

In accordance with the teachings of the present invention, a secure provisioning manifest and a secure I/O module are provided for authenticating and securely communicating with authenticated peripherals attached to a computer and for withdrawing the authentication and terminating the secure communications when operating parameters for any peripheral indicates that a security attack against the peripheral is in progress.

Among its several aspects, the present invention recognizes there is an advantage to being able to identify and authenticate peripherals attached to a computer and to establish a secure encrypted session to communicate with authenticated peripherals. The advantage includes determining when unauthorized or unsecure peripherals are attached to the computer and further determining if an unauthorized or unsecure peripheral represents a security threat to the computer. When a peripheral represents a security threat, actions are taken to restrict communications with the peripheral or to terminate all normal functions of the computer.

Among its several aspects, the present invention recognizes there is an advantage to being able to identify when a security attack against an authenticated peripheral has been occurring or has just started. The advantages include determining the presence of a security attack by monitoring over time certain operating parameters of an authenticated peripheral to detect changes in operating characteristics and by detecting certain operating characteristics associated with a security attack.

In accordance with an embodiment of the present invention, there is provided a method implemented by a secure I/O module of a computer using a secure provisioning manifest stored within the secure I/O module to secure information communicated with peripherals attached to the computer where the computer includes a main processor for executing an operating system where the main processor cannot access elements within the secure I/O module. The method comprising: authenticating a peripheral attached to the computer using information from the secure provisioning manifest; establishing a secure encrypted communication session with the authenticated peripheral; polling periodically to obtain current operating parameters for the authenticated peripheral; and terminating the secure encrypted communication session and withdrawing authentication for the peripheral when one or more of the current operating parameters of the peripheral fails to correlate with corresponding known operating parameters for peripheral.

A more complete understanding of the present invention, as well as further features and advantages of the invention, will be apparent from the following Detailed Description and the accompanying Drawings.

BRIEF DESCRIPTION OF THE DRAWINGS

The present invention may take form in various components and arrangement of components and in various methods. The drawings are only for purposes of illustrating example embodiments and alternatives and are not to be construed as limiting the invention. The drawings are not necessarily drawn to scale. Throughout the drawings, like element numbers are used to describe the same parts throughout the various drawings, figures and charts.

DETAILED DESCRIPTION

In the following description, numerous details are set forth to provide an understanding of the claimed invention. However, it will be understood by those skilled in the art that aspects of the claimed invention may be practiced without utilizing all of these details and that numerous variations or modifications from the described embodiments are possible and envisioned.

Figure 1:
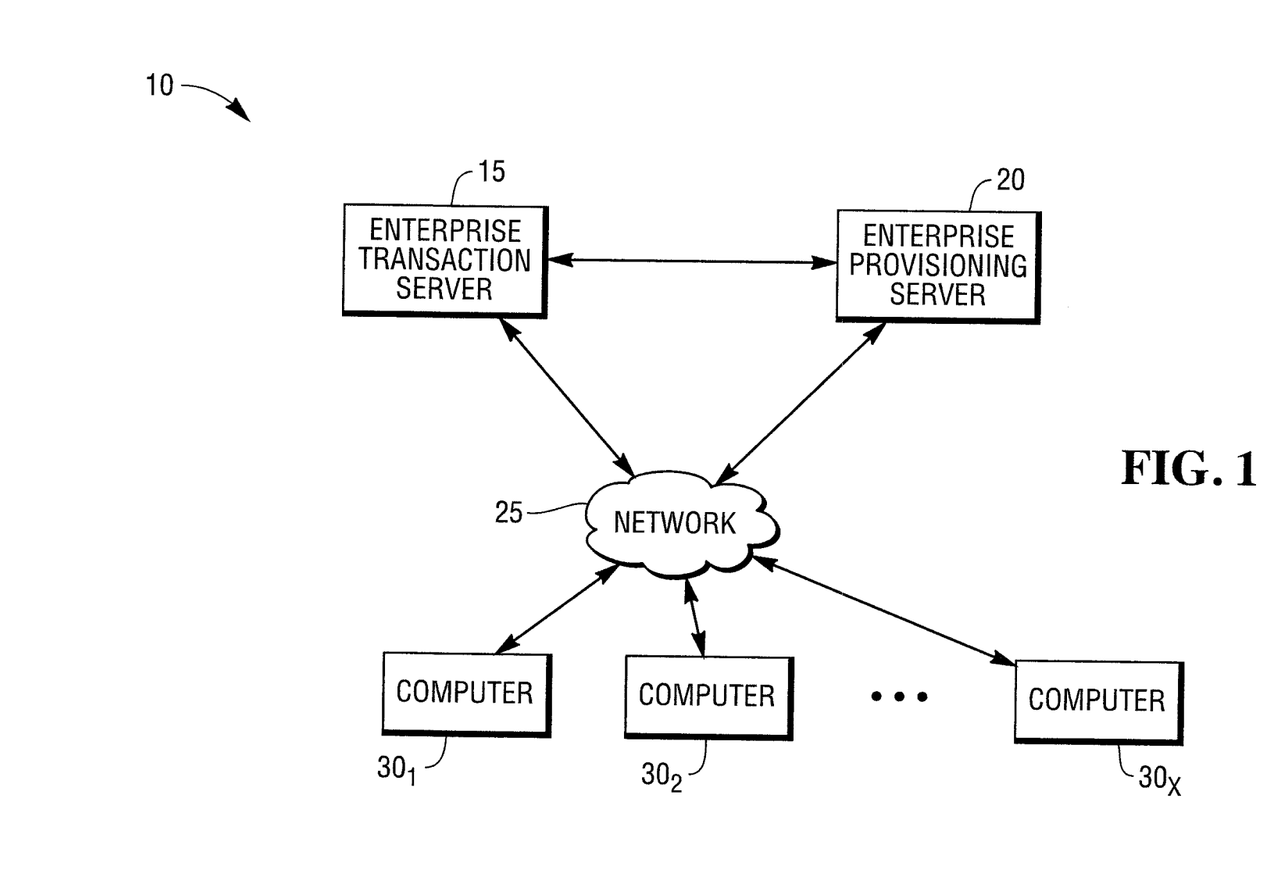
FIG. 1 is a high-level block diagram illustrating a transaction system of the present invention.

With reference to FIG. 1, there is provided a high-level block diagram illustrating a transaction system 10 including an enterprise transaction server 15 and an enterprise provisioning server 20 where each server is connected to a plurality of transaction computers $30_{1-X}$ over a network 25. The enterprise transaction server 15 is a secure server and executes a secure transaction service that facilitates transactions between the transaction computers $30_{1-X}$ and external services. The external services may suitably include services provided by financial acquirers that accept credit card transactions and financial institutions that process debit transactions.

A secure server is preferably a server computer physically located within a secure data center. A secure data center limits and controls physical and remote access to computers within the center. The computers within the secure data center are provided with network connections to one or more outside public or private networks so they can provide one or more services to customers. A secure computer may suitably execute software that performs financial transactions or processes valuable and/or sensitive information.

Figure 2A:
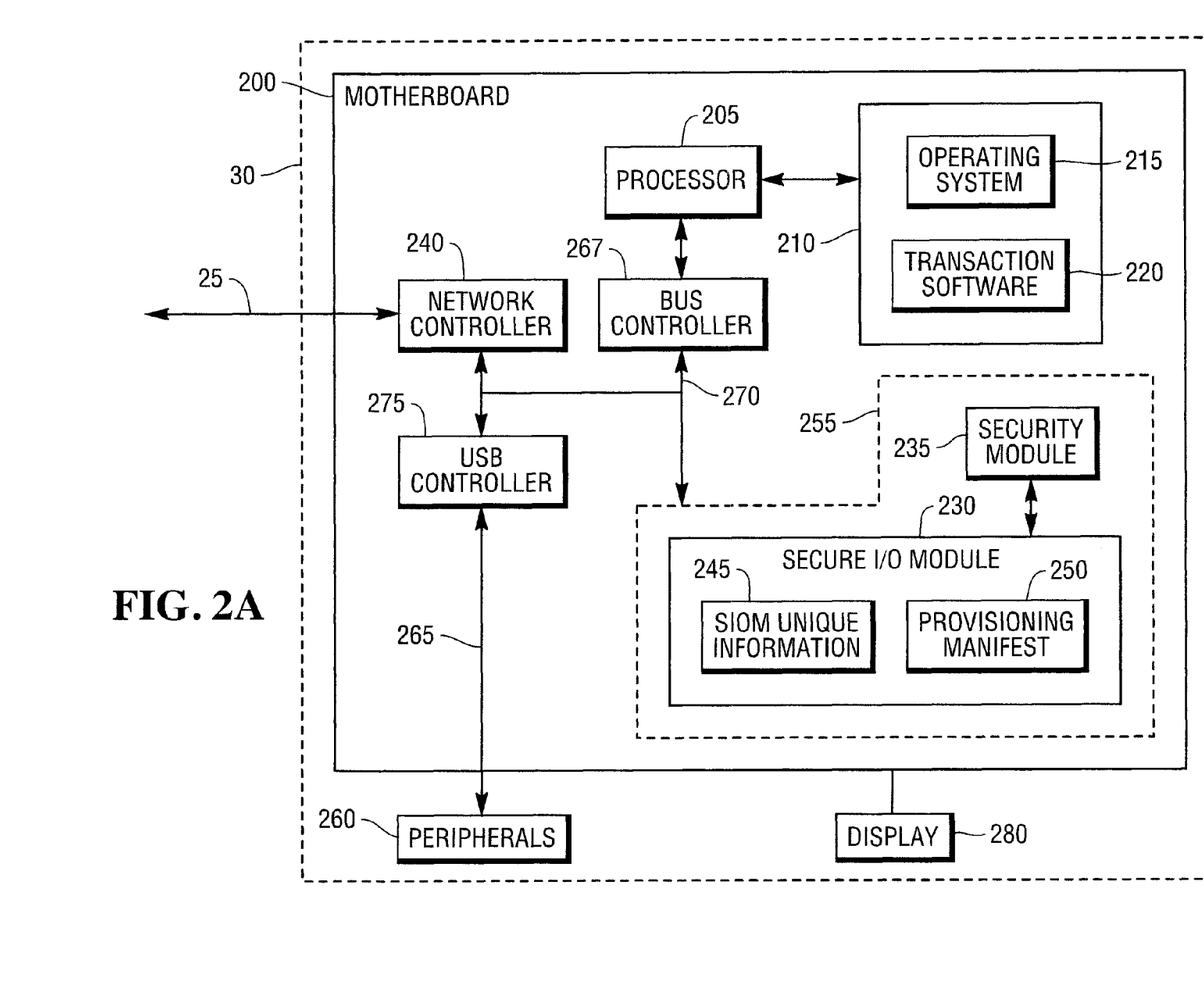
FIG. 2A is a high-level block diagram illustrating selected hardware and software components of one embodiment of a transaction computer.

The enterprise provisioning server 20 is a secure server and executes enterprise provisioning software. The enterprise provisioning software maintains data about all the transaction computers $30_{1-X}$. The data includes unique information that identifies each of the transaction computers $30_{1-X}$ and includes a secure provisioning manifest (FIG. 2, element 250) that includes information identifying peripherals that are authorized to be attached to each of the transaction computers $30_{1-X}$. The enterprise provisioning server 20 also receives status information from each of the transaction computers $30_{1-X}$. The status information may suitably include alert information when an unauthorized peripheral is determined to be attached to one of the transaction computers $30_{1-X}$.

The transaction computers $30_{1-X}$ are coupled to the remote enterprise transaction server 15 and enterprise provisioning server 20 via the network 25. The network 25 may suitably include a network which uses a communications protocol based on transmission control protocol/internet protocol (TCP/IP). The network 25 may suitably include a combination of local area and wide area networks. The network 25 may suitably include any combination of wireless or wired networks. The network 25 may suitably include a combination of private and public networks, including a global communication network, also known as the Internet. The term cloud based server is sometimes used and refers to a remote computer server accessed over a public network, such as the Internet.

The transaction computers $30_{1-X}$ may suitably be located within a single location, for example in a single retail store, or they may be divided among many locations across a large geographic area. For example, the transaction computers $30_{1-X}$ may be divided among multiple stores owned by a single company where the stores are located around the world. The transaction computers $30_{1-X}$ may suitably include multiple different types of computers. One example embodiment of the transaction computers $30_{1-X}$ includes a computer configured as a self-service point-of-sale (POS) transaction terminal used to process customer purchase transactions where a customer operates the terminal. Another example embodiment of the transaction computers $30_{1-X}$ includes a computer configured as an assisted point-of-sale (POS) transaction terminal used to process customer purchase transactions where an employee operates the terminal. Other examples of transaction computers include automatic teller machines (ATM), self-service terminals including travel kiosks and gas pumps and the like. Other example transaction computers and environments are also envisioned.

Turning now to FIG. 2A, there is provided a high-level block diagram illustrating selected hardware and software components of one embodiment of a transaction computer 30 that may suitably be used as any one of the transaction computers $30_{1-X}$. The transaction computer 30 includes a motherboard 200, a display 280 and a plurality of peripherals 260 where one or more may suitably be attached to and controlled by the transaction computer 30. The motherboard 200 includes a processor 205, a memory 210, a bus controller 267, a network controller 240, a universal serial bus (USB) controller 275 and a secure processing module 255. The processor 205 communicates with the memory 210 which includes stored computer instructions that implement an operating system 215 and computer instructions that implement transaction software 220. The processor 205 executes the computer instructions stored in the memory 210. The processor 205 creates a standard data processing environment wherein computer instructions stored in the memory 210 are executed under the control of the operating system 215. While the processor 205 and other processors that are described herein are depicted and referred to as a single processor, multiple processors and processors with multiple processor cores are envisioned and within the scope and definition of this invention.

The memory 210 uses non-transitory storage devices including both volatile and non-volatile memory. The non-volatile memory may suitably include flash memory, other types of solid state electronic memory and rotating storage devices, such as disk drives or the like. Non-volatile memory retains stored information after power is removed from the memory and until power is restored. Computer instructions stored in the memory 210 are executed by the processor 205 and cause the processor 205 to control the devices and peripherals attached to the transaction computer 30 and to provide the services and functions performed by the operating system 215 and the transaction software 220. The operating system 215 may suitably include a Microsoft, Linux, Apple, or other digital computer operating system. The transaction software 220 displays transaction screens on the display 280 for guiding an operator through a transaction and receives operator inputs and selections during the transaction. The transaction software 220 may also process a payment for the transaction by sending transaction information to a third party for processing. In some embodiments, the transaction software 220 relies on other software to process the transaction and provide an acknowledgement once payment has been made.

The transaction computer 30 further includes display graphics circuitry for providing display screens to the display 280. The display 280 may suitably include a flat panel LCD display and it may also include a touch screen device that senses the location of a touch to the display area of the display 280. The bus controller 267 provides a high speed computer bus 270 that allows the processor 205 to communicate with the standard components on the motherboard 200. The network controller 240 provides the hardware and software needed to connect to and support communications with the network 25. The operating system 215 includes driver software that interfaces with the network controller 240 and provides a network stack that supports the communication's protocol used by the network 25. One or more of the peripherals 260 are connected to the transaction computer 30 over a Universal Serial Bus (USB) 265 controlled by the USB controller 275. The USB bus 265 is a powered USB bus where the USB controller 275 provides electrical power needed to power the peripherals 260. The USB controller 275 generates multiple independent powered USB buses 265 (sometimes called ports) where one of the independent powered USB buses is connected to each peripheral 260. In some embodiments, the USB controller 275 includes a power monitoring component that measures the amount of electrical current being used by each of the one or more peripherals 260 attached to each of the USB buses 260. In some embodiments, the USB controller 275 includes an electrical load detection component that detects the number of electrical loads for data signals for each of the powered USB buses 265. The electrical loads can be used to determine the number of devices that are attached to a bus. The number of devices attached to the USB bus 265 for each peripheral is known and should not change over time.

In some embodiments, one or more of the peripherals 260 may communicate over other connections such as serial RS-232, serial RS-485, Firewire, or other circuitry for connecting peripherals. The operating system 215 may establish basic communications with some or all of peripherals 260 connected to the transaction computer 30 at a driver level. An application program interface (API) is provided that uses the driver level connection for each of the peripherals 260. The secure processing module 255 has access to the API to communicate with the peripherals 260.

The secure processing module 255 provides a secure processing environment separate from the standard processing environment provided by the processor 205 executing the computer instructions stored in the memory 210. The secure processing module 255 and the processor 205 can communicate with each other over a computer bus 270. However, the processor 205 does not have access to or control over elements within the secure processing environment provided by the secure processing module 255. More details of the secure processing module 255 are provided below.

In other example embodiments, the security processing module 255 may be external to the transaction computer 30. For example, the security processing module 255 may be incorporated into its own separately housed component for retrofitting existing computers without built-in capability or into a peripheral. Either example may be connected to the transaction computer 30 through peripheral connection circuitry. In another example, the secure processing module 255 may be implemented in a separate secure computer that controls a number of peripherals at different locations for example, a single secure computer would suitably control the card reader at each gas pump of a gas station and a different transaction computer would process the purchase transaction while communicating with the secure computer to process payments.

The secure processing module 255 may be implemented using digital hardware logic, software instructions, or a combination of both. The secure processing module 255 has a secure processing environment that is separate from the standard processing environment of the motherboard 200 that is created by the processor 205. In some embodiments, both the secure processing environment and the standard processing environment are created by one processor that is running virtual machine software responsible for separating the two environments.

The secure processing module 255 protects customer information received from one or more of the peripherals 260 by establishing a secure encrypted session with each peripheral 260. For example, the secure I/O module 230 may communicate with one of the peripherals 260, such as a card reader peripheral 40 (FIG. 2B) via standard protocols and/or proprietary protocols via the USB controller 275. Once the card reader peripheral 40 is authenticated, the secure I/O module 230 establishes a secure encrypted session with the card reader peripheral 40. The card reader peripheral 40 then encrypts all data it sends to the secure I/O module 230 and only the secure I/O module 230 can decrypt it. The secure I/O module 230 may suitably decrypt and provide the data received from the card reader peripheral 40 to the operating system 215 which provides it to the transaction software 220. Not all data is decrypted and sent to the operating system 215. The secure I/O module 230 also encrypts any data it sends to the card reader peripheral 40. No cryptographic key data is transferred between the secure I/O module 230 and the peripheral during the process of establishing the secure encrypted session. Cryptographic keys need not be communicated because the secure provisioning manifest 250 includes all cryptographic key data needed by the secure I/O module 230 to encrypt and decrypt data communicated between the peripheral and the secure I/O module 230.

The secure I/O module 230 preferably controls the flow of encrypted data from the peripherals 260 independently of the operating system 215, with the operating system 215 only establishing a connection with the peripherals 260 at a driver level. It should also be noted that once the secure session is established with one of the peripherals 260, the data received and transmitted by the driver level connection is encrypted and the operating system 215 cannot decrypt or encrypt the data. Only the secure I/O module 230 can decrypt or encrypt the data.

The secure I/O module 230 is invisible to operating system 215. That is, the operating system 215 has no driver for or control over the secure I/O module 230 and no control over the secure encrypted sessions between the secure I/O module 230 and the peripherals 260. In the case where the Intel Core vPro™ brand processor is used for the processor 205, the operating system 215 has no driver or other control of the portion of the processor 205 that performs the functions of the secure I/O module 230. This arrangement minimizes the chance of a fraudster gaining access to the encryption keys stored in the secure processing module 255 through the operating system 215.

The operating system 215 uses the network controller 240 on the motherboard 200 to communicate over the network 25. In some embodiments, software executing in the secure processing module 255 uses a software interface to the operating system 215 to send and receive information over the network 25. In other embodiments, the secure processing module 255 includes separate network hardware and software, not available to the operating system 215, to communicate with remote computers (such as, the enterprise transaction server 15 and the enterprise provisioning server 20, for example) either over the network 25 or over a different network. In still other embodiments, the secure processing module 255 uses both the interface to the operating system 215 and the separate network hardware and software to communicate with the remote computers.

The secure I/O module 230 controls secure encrypted sessions with the peripherals attached to the transaction computer 30 that are able to support encrypted sessions. The peripherals include the display 280 and one or more of peripherals 260 depicted in FIG. 2B. The secure I/O module 230 polls all attached peripherals upon power up to obtain information that uniquely identifies the peripheral. The information includes the vendor's model, product identification and serial number of the peripheral. The secure I/O module 230 uses the secure provisioning manifest 250 to determine if the secure I/O module 230 is authorized to communicate with each peripheral. The secure provisioning manifest 250 includes peripheral information for each peripheral that the secure I/O module 16 is authorized to communicate with. If the unique information from the peripheral matches corresponding information in the secure provisioning manifest 250 then, the secure I/O module 230 queries the peripheral to determine if it can communicate via an encrypted data link. If the peripheral can communicate via an encrypted data link, then the secure I/O module 230 issues a specific test message to the peripheral, to which the secure I/O module 230 expects a certain encrypted response. If the response matches what is expected, then the secure I/O module 230 establishes a secure encrypted session with the peripheral which causes all data to be encrypted prior to transmission.

In addition to the initial authentication and establishment of the secure encrypted session, the secure I/O module 230 periodically tests the unique information of the peripheral to ensure the authorized peripheral has not been replaced by a substitute peripheral. If the authorized peripheral has been removed, the secure encrypted session is terminated and the secure I/O module 230 starts the peripheral identification process for any new peripheral that is found.

The secure processing module 255 further includes a security module 235. The security module 235 includes software that implements additional features and functions used to process transactions. These functions include communicating with the enterprise transaction server 15 to process a transaction using information acquired from one or more of the peripherals 260 over a secure encrypted session. The security module 235 also stores encryption keys, which may include communication or session keys, financial provider keys, and retail provider keys.

Figure 2B:
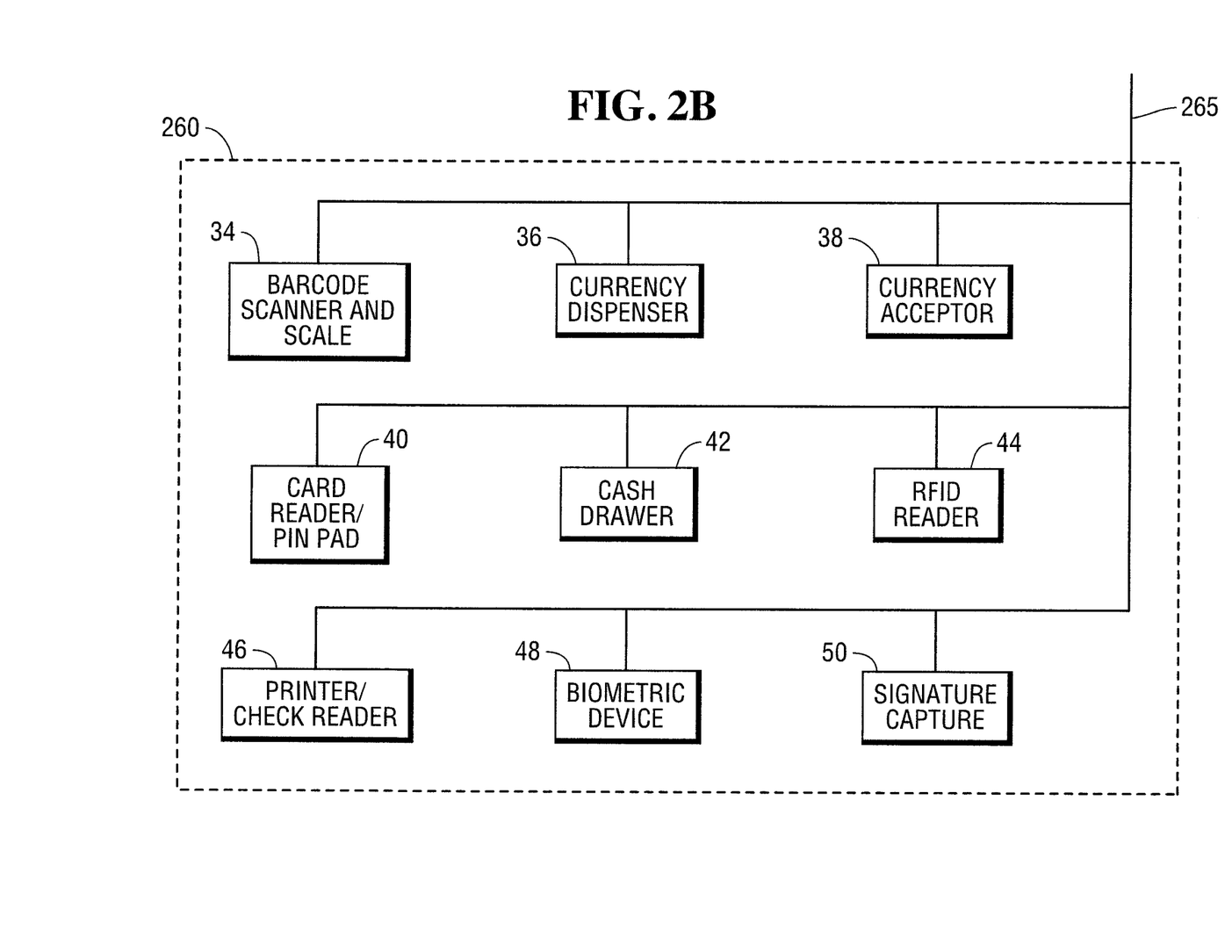
FIG. 2B is a high-level block diagram illustrating selected peripherals supported by the transaction computer of FIG. 2A.

Turning now to FIG. 2B, there is provided a high-level block diagram illustrating selected peripherals 260 that may be attached to the transaction computer 30. The peripherals 260 communicate with the transaction computer 30 using a USB connection or other suitable forms of computer communications. The transaction computer 30 further provides the electrical power to operate the peripherals 260 using the USB connection. In some embodiments, peripherals that have high power demands also have separate power cables. The peripherals 260 depicted in FIG. 2B are not meant to be an exhaustive list nor is it meant to imply that all of the peripherals 260 depicted must be present in any one embodiment of the transaction computer 30 used in the transaction system 10. The peripherals 260 include a barcode scanner and scale 34, a currency dispenser 36, a currency acceptor 38, a card reader/pin pad 40, a cash drawer 42, a radio frequency identification (RFID) reader 44, a printer/check reader 46, a biometric device and a signature capture device 50. In some embodiments, the barcode scanner (also known as an optical code scanner) and scale 34 includes a laser based and an image based scanner for reading optical codes. Some embodiments just use an image based scanner.

Figure 3:
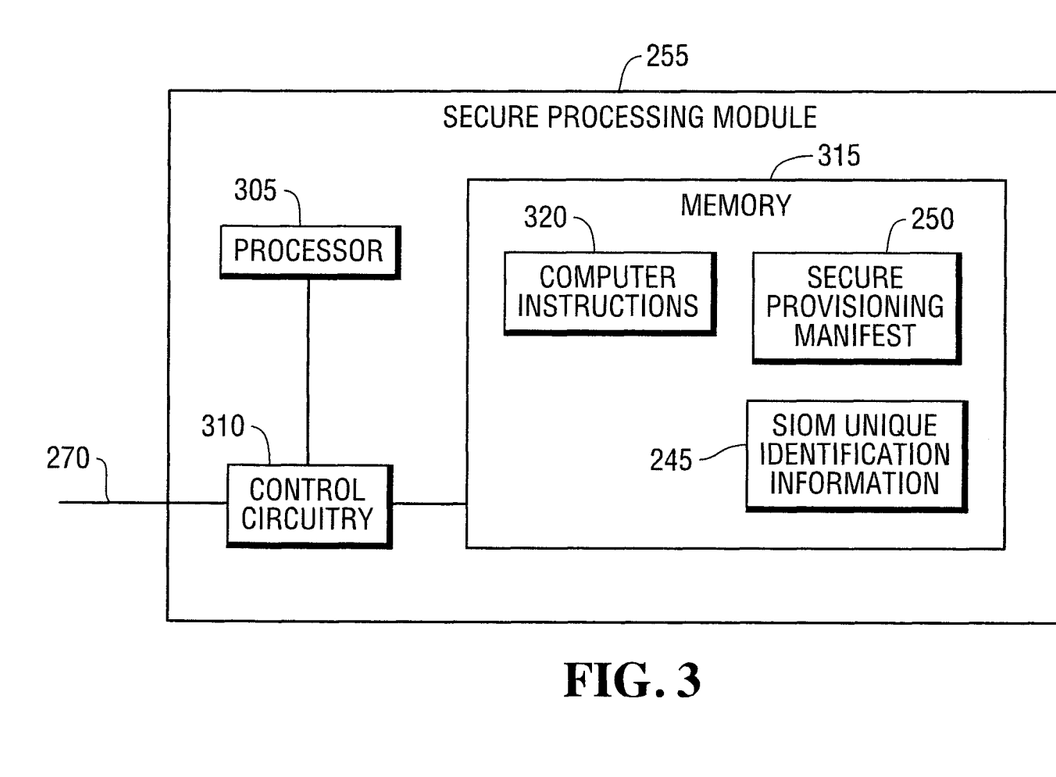
FIG. 3 is a high-level block diagram illustrating selected hardware and software components of a secure processing module.

With reference to FIG. 3, there is provided a high-level block diagram illustrating selected hardware and software components of the secure processing module 255. The secure processing module 255 includes a processor 305, a memory 315 and control circuitry 310. Stored within the memory 315 are computer instructions 320, the secure provisioning manifest 250 and information 245 that uniquely identifies the secure I/O module 230. When the processor 305 executes the computer instructions 320, the computer instructions 320 cause the processor 305 to implement the features and functions performed by the secure I/O module 230 and the security module 235.

The memory 315 is comprised of non-transitory storage devices including both volatile and non-volatile memory. The non-volatile memory may include flash memory and other types of solid state electronic memory that are non-volatile. The processor 305 may include a processor that has multiple processor cores or may be comprised of multiple processors.

The memory 315 further includes the unique identification information 245 for the secure I/O module 230. The unique identification information 245 includes a unique identifier for the secure I/O module 230 and a private cryptographic key (private key) associated with the secure I/O module 230. The private key has a unique public key associated with it. The public key is stored in the enterprise provisioning server 20 and used to encrypt data sent to the secure I/O module 230. The secure I/O module 230 uses its private key to decrypt the data encrypted with its public key. Only the private key can decrypt data encrypted with the public key and only the public key can decrypt data encrypted with the private key.

The computer instructions 320 and the unique identification information 245 are injected or stored in the memory 315 during the process of manufacturing the secure processing module 255. The secure provisioning manifest 250 is stored in the memory 315 and is encrypted using the secure I/O module's 230 public key and the secure I/O module's 230 private key will decrypt it. The secure provisioning manifest 250 can be updated at anytime for any of a number of reasons. The enterprise provisioning server 20 generates a new version of the secure provisioning manifest 250 as needed using the unique public key for the secure I/O module 230.

For example, when a customer service technician replaces a failed peripheral in a transaction computer 30, the technician communicates information identifying the removed peripheral and information uniquely identifying a replacement peripheral to the enterprise provisioning server 20. The enterprise provisioning server 20 then generates an updated secure provisioning manifest 250 for the transaction computer 30 using the public key for the secure I/O module 230 known to be present in that transaction computer 30. The updated secure provisioning manifest 250 is then transmitted to the transaction computer 30 over the network 25. The secure I/O module 230 receives the updated secure provisioning manifest 250 and stores it in the memory 315 replacing the prior version.

The control circuitry 310 allows the processor 305 to communicate with the computer bus 270. This allows the processor 305 to perform a number of software functions and hardware functions that interface with software executed by the processor 205. For example, the processor 305 can generate a logical peripheral interface that simulates a driver interface to one of the peripherals 260. The processor 205 accesses the logical peripheral interface instead of the physical peripheral interface. The processor 305 has access to the physical peripheral using the computer bus 270. In some embodiments, substituting the logical peripheral interface for the physical peripheral interface is transparent to the software being executed by the processor 205. This allows for the use of legacy software that does not need to be updated. In some embodiments, an application program interface (API) is used by software executed by the processor 205 to communicate with the peripherals 260. For certain peripherals, the API communicates over the computer bus 270 with the control circuitry 310 instead of communicating directly with the peripheral. The computer instructions 320 executed by the processor 305 receive and implement the communication requests.

In one embodiment, the secure processing module 255 is a hardware module installed on the motherboard 200. In some embodiments, the secure processing module 255 is preferably tamper resistant to prevent access to the cryptographic keys stored in the memory 315. Tamper resistance may suitably include one or more electrical and mechanical safeguards to prevent physical tampering with the secure processing module 255. For example, the secure processing module 255 may include electrical circuits and switches that detect an unauthorized opening of the enclosure of the transaction computer 30, or physical intrusion into the secure processing module 255 or an enclosure around the secure processing module 255, and upon detection, erase the cryptographic keys and optionally the software stored in the memory 315, thereby disabling the secure processing module 255.

In one embodiment, the secure processing module 255 includes a processor 305, a memory 315 and control circuitry 310. Computer instructions 320 and data including information uniquely identifying the secure I/O module 230 and a secure provisioning manifest 250 are preloaded into the memory 315 before the secure processing module 255 is mounted on the motherboard 200, or the computer instructions 320 and the data are loaded into the secure processing module 255 after it is mounted on the motherboard 200, but prior to being shipped to a customer in the terminal computer 30.

The secure processing module 255 includes the security module 235 and the secure I/O module 230. Both of these modules may suitably be implemented in digital hardware or software or a combination of both.

Figure 4:
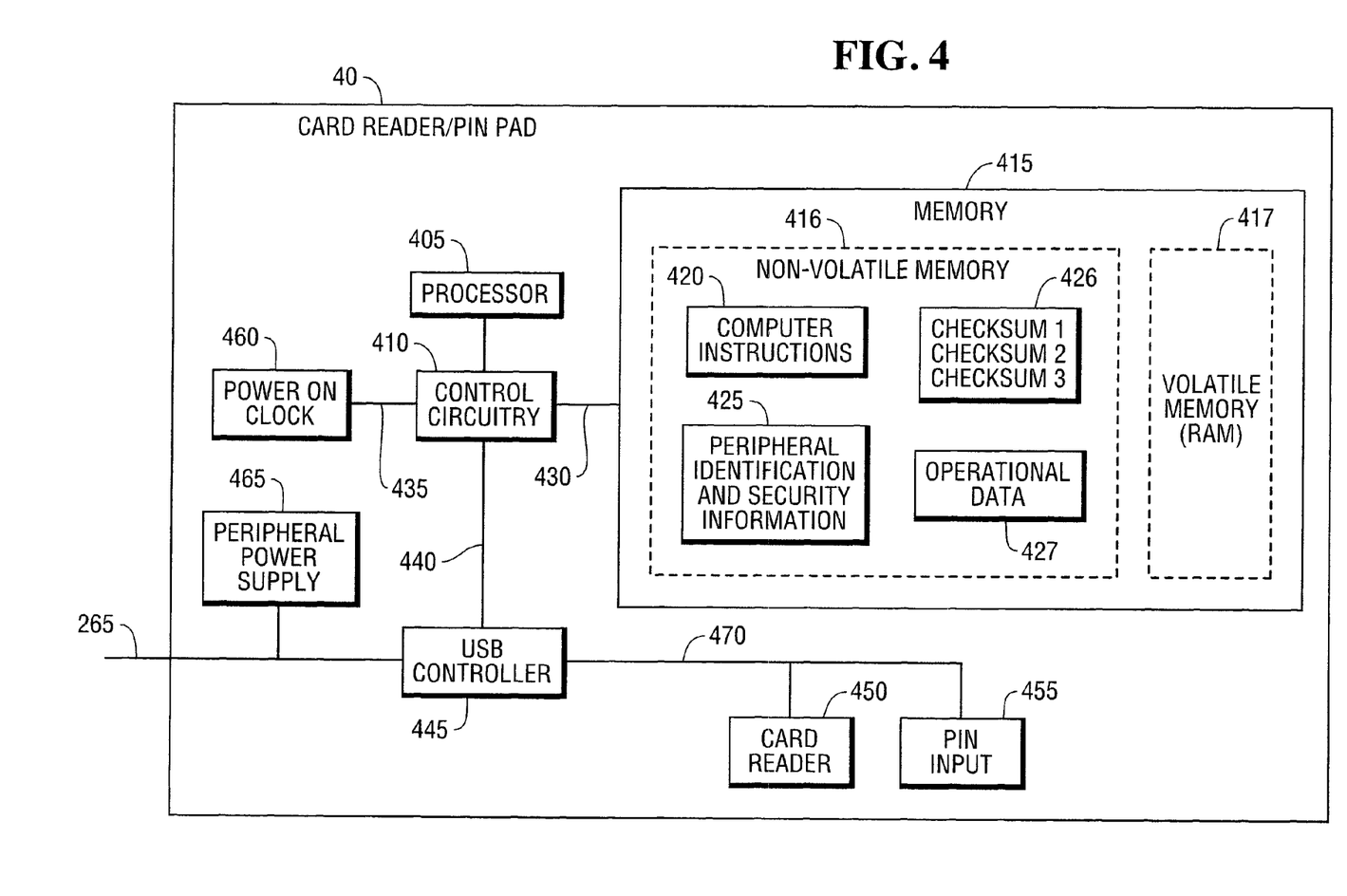
FIG. 4 is a high-level block diagram illustrating selected hardware and software components of a card reader/PIN pad peripheral.

Turning now to FIG. 4, there is provided a high-level block diagram illustrating one example of the card reader/pin pad input peripheral 40. The card reader/pin input peripheral 40 is one of a plurality of different peripherals (see FIG. 2B) that can be attached to a transaction computer 30 using the USB bus 265. The card reader/pin pad input (card reader) peripheral 40 includes a processor 405, a memory 415, control circuitry 410, a USB controller 445, a power on clock 460, a peripheral power supply 465, a card reader device 450 and a pin input device 455.

The control circuitry 410 is depicted as a single block but may suitably be embodied as an amalgamation of control circuitry that provides interfaces: between the processor 405 and the memory 415 over a memory bus 430; between the processor 405 and the power on clock 465; and between the processor 405 and the USB controller 445. The interface between the processor 405 and the memory 415 allows the processor 405 to read and write information from any memory location within the memory 415. The processor 405 uses the interface to read and execute computer instructions 420 stored in the memory 415. The computer instructions 420 when executed by the processor 405 cause the processor 405 to implement the features and functions of the card reader peripheral 40 and control the devices and components of the card reader device 40. The processor 405 may include a processor that has multiple processor cores or may be comprised of multiple processors.

The memory 415 is comprised of non-transitory storage devices including both volatile memory 417 and non-volatile memory 416. The non-volatile memory 416 may suitably include flash memory and other types of solid state electronic memory that retain stored electronic data after power is removed from the memory. The non-volatile memory 416 includes the computer instructions 420, peripheral identification and security information 425, checksum data 426 and operational data 427. The volatile memory 417 includes random access memory (RAM) used to store temporary data produced by executing the computer instructions 420. Data not moved to non-volatile memory 416 will be lost when power is removed from the memory 415.

The checksum data 426 includes checksum 1, checksum 2 and checksum 3. Checksum 1 is a checksum value for the area of non-volatile memory 416 that has been allocated to the computer instructions 420. Checksum 2 is a checksum value for the area of non-volatile memory 416 that has been allocated to the peripheral identification and security information 425. In some embodiments, additional checksums are used for other areas of allocated non-volatile memory, such as the operational data 427. Checksum 3 is a checksum value for the area of non-volatile memory 416 that is un-allocated memory or memory that is not used and has not been allocated for any specific function or purpose. The un-allocated memory is suitably set to a predetermined value. Any unauthorized use of the un-allocated memory would cause a current or real-time generated checksum for the un-allocated memory to have a value different from the value of checksum 3.

A checksum is a number generated by processing a block of digital data to obtain a unique value for that specific block of digital data. Any change to the contents of the block of digital data would result in a different unique value being generated. Checksums are use to determine if a block of digital data has been altered by comparing an expected or known checksum value to the current or real-time generated checksum value. If the checksums match, the block of digital data has not been altered from it expected content. If the checksums do not match, the block of digital data has been altered in some way. There are numerous methods that are used to calculate a checksum. Most checksum methods use some form of hashing or fingerprinting functions. The same method must be used to calculate the current and known checksum values.

The processor 305 on the transaction computer 30 may suitably send a command to the peripheral 40 causing the computer instructions 420 to cause the processor 405 to calculate a current checksum for any block of digital data stored in the non-volatile memory 416 and represented by one of the stored checksums 426. The processor 405 returns the stored checksum and calculated checksum to the processor 305. The processor 305 has known checksum values stored in the memory 315 for the card reader peripheral 40. The processor 305 compares the known checksum values to the received current and stored checksum values. If any comparison fails, some data has been modified and authorization to use the card reader peripheral 40 is withdrawn. All checksum related communications with the card reader peripheral 40 use the secure encrypted session.

In addition to the computer instructions 420, peripheral identification and security information 425 is also stored in the memory 415. The peripheral identification and security information 425 is stored in a non-volatile portion of the memory 415 during the manufacturing process for the card reader peripheral 40 or at some point before it is delivered for integration with the transaction computer 30. The peripheral identification and security information 425 includes information that uniquely identifies the card reader peripheral 40, such as a serial number, and the vendor that manufactured the card reader peripheral 40 plus a model number for the card reader peripheral 40 and cryptographic information unique to the card reader 40. The cryptographic information includes a private key that was generated as part of a public/private cryptographic key pair unique to the card reader peripheral 40 where the public key from the key pair is stored in the secure provisioning manifest 250 in a record that identifies the card reader peripheral 40.

The operational data 427 is also stored in the non-volatile memory 416. The operational data 427 may suitably include data and information typically used in the maintenance of a peripheral such as component life limits and cycle limits. Some components of a peripheral have life limits or cycle limits. As components approach their life or cycle limits, they begin to experience a high level of failure. The peripheral will typically fail when any component fails which renders the peripheral unusable and could prevent the transaction computer 30 being able to perform a purchase transaction or other service. Examples of cycle limits include the number of times a magnetic stripe is read, the number of misreads of a magnetic stripe, the number of power cycles, the number of times each key pad is pressed, the number of characters printed, the number of items scanned, the number of currency notes dispensed, the number of currency notes accepted and the number of times the cash drawer is opened and other like events. The list of examples is not meant to be an exhaustive list. An example of a life limit includes total power-on time. Certain electronic components such as capacitors used in a power supply and disk drives have life limits based on their total operating time. As these life limits are approached, the number of failures will increase. The computer instructions 420 cause the processor 405 to collect and maintain the operational data 427 for the peripheral 40 including the components of the peripheral 40. The operational data 427 can be read by the processor 305 on the transaction computer 30.

The interface between the processor 405 and the USB controller 445 uses a computer bus 440 to communicate with the USB controller 445. The USB controller 445 interfaces with the USB bus 265 and generates an internal USB bus 470. The USB bus 265 connects the card reader peripheral 40 to the transaction computer 30. The internal USB bus 470 is used to communicate with the card reader device 450 and the pin reader device 455. This embodiment uses the industry standard USB bus but other embodiments may suitably use different types of buses based on different standards and protocols.

The card reader device 450 includes a magnetic stripe reader that is configured to read information from a magnetic stripe included on cards. In some embodiments, the card reader device 450 communicates with a computer chip located within a card to read information. The card reader device 450 may use a radio frequency transceiver or mechanical contacts to communicate with the computer chip within the card. The information read from the card may suitably include financial information and/or customer information.

The card reader peripheral 40 includes the PIN input device 455 that includes a key pad used by a person to enter information. For financial transactions, the information may suitably be a personal identification number (PIN) code which is used with the information read from the card to process a payment. In some embodiments, the pin input device 455 includes a display that displays information about a financial transaction, instructions to the person and information that has been entered on the key pad. In some embodiments, the display includes a touch screen feature that is used instead of a key pad to input information from the person using the pin input device 455.

The peripheral power supply 465 receives electrical power from the USB bus 265 and provides it to the card reader peripheral 40. The peripheral power supply 465 detects when electrical power is applied to the USB bus 265 during the power up process. When the +5 volt electrical supply on the USB bus 265 has reached and stabilizes at 5 volts, the peripheral power supply 465 issues a hardware reset signal for a predetermined period of time to all the components of the card reader peripheral 40 including the processor 405. When the hardware reset signal is removed after the predetermined period of time, the processor 405 accesses the computer instructions 420 at a predetermined memory location and starts executing the computer instructions 420.

The power-on clock 460 is a device that measures the total time the card reader peripheral 40 has electrical power applied and is operating. The power-on clock 460 includes a timer component, non-volatile memory and bus interface logic to communicate with the control circuitry 410. After electrical power is applied to the power-on clock 460 and the hardware reset signal has been removed, the power on clock 460 uses the timer component to maintain a total power on time value that represents the total amount of time the card reader peripheral 40 is powered on and operating. The total power on time value is stored in the non-volatile memory which retains the total power-on time value when power is removed. The processor 405 reads the total power-on time value from the power on clock 460 using the control circuitry 410. In some embodiments, the function of the power on clock 460 is implemented using a hardware timer included in the processor 405 and software that is included within the computer instructions 420. The total power-on time value is stored with the operational data 427. The processor 305 can issue a command to the processor 405 that causes the processor 405 to return the total power-on time value to the processor 305. The returned total power-on time value is one of the operating parameters and it compared to a total power-on time maintained by the processor 305 for the card reader peripheral 40.

Figure 5:
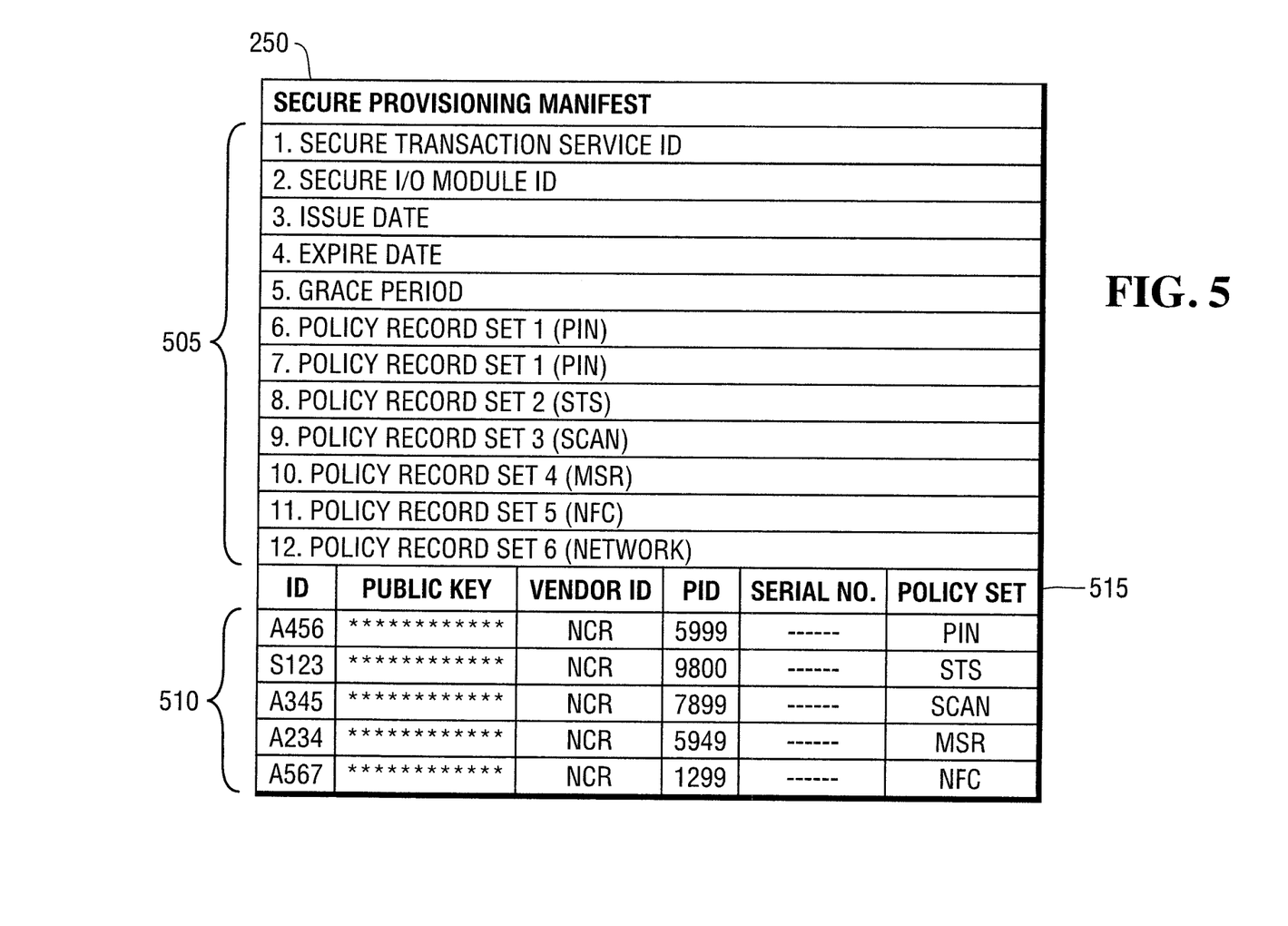
FIG. 5 is a high-level diagram illustrating a secure provisioning manifest of the present invention.

With reference to FIG. 5, there is provided a high-level diagram illustrating an example of the secure provisioning manifest 250. The secure provisioning manifest 250 is delivered to and stored in the secure processing module 255 encrypted using the public key associated with the secure I/O module 230. When data from the secure provisioning manifest 250 is required, the secure I/O module 230 decrypts it using the private key 245 associated with the secure I/O module 230 and stored in the memory 315. A successful decryption of the secure provisioning manifest 250 also authenticates the secure provisioning manifest 250.

The information depicted in this embodiment of the secure provisioning manifest 250 is not meant to be limiting or all inclusive. In this example embodiment, the secure provisioning manifest 250 is divided into a first section 505 and second section 510. The first section 505 includes 12 records numbered 1-12. Other embodiments will include a different number of records. Record 1 includes information that identifies the secure transaction service and the secure enterprise transaction server 15 used to process financial transactions for the transaction computer 30. Record 2 includes information that uniquely identifies the secure I/O module 230 installed on the transaction computer 30. Record 3 includes information that identifies an issue date for the secure provisioning manifest 250. Record 4 includes information that identifies an expiration date for the secure provisioning manifest 250. When this date is reached or just prior to the date, the secure I/O module 230 requests a new secure provisioning manifest 250 from the enterprise provisioning server 20. Record 5 includes information that identifies a grace period for the secure provisioning manifest 250 which defines a period of time (if any) an expired secure provisioning manifest 250 may be used after its expiration date.

Records 6-12 are policy records. The secure provisioning manifest 250 may include any number of policy records. This embodiment includes seven policy records. A policy record includes a policy rule that defines how a resource is used. Each policy record is associated with a peripheral or a resource of the transaction computer 30. There can be multiple policy records for each peripheral or resource. For example, the barcode scanner 34 can read 1D barcodes and 2D barcodes. 1D barcodes are typically used to identify items presented for purchase while certain 2D barcodes may in addition be used to encode sensitive information on identification documents. Therefore, a first policy record associated with the barcode scanner peripheral 34 could have a rule requiring that data read from 1D barcodes be returned to the operating system 215 as decrypted clear text. A second policy record also associated with the barcode scanner peripheral 34, has a rule requiring that data read from 2D barcodes is returned to the operating system 215 as encrypted text to protect the data. The secure I/O module 230 decrypts the data and retains a decrypted version of the data and uses it to process a financial transaction, if needed. However, the applications executed by the processor 205 of the transaction computer 30 cannot decrypt the data and can only process the data sent in clear text form.

Records 6 and 7 are policy records associated with the PIN or pin pad component of the magnetic stripe reader peripheral 40. Record 8 is a policy record associated with the secure transaction service running on the enterprise transaction server 15. The rule can define which transactions are sent to the secure transaction service for processing and which transactions are sent to the operating system 215 for legacy processing by the transaction software 220. Record 9 is a policy record associated with the barcode scanner 34. Record 10 is a policy record associated with the magnetic stripe reader peripheral 40. Record 11 is a policy record associated with the near field communications peripheral which is included in the RFID reader 44. Record 12 is a policy record associated with the network controller 240 function of the motherboard 200. This record would include a rule on using the network controller 240 to communicate with external computers.

Certain legacy peripherals cannot support encrypted secure sessions so policy records are set up for these peripherals that state the peripheral cannot support encrypted sessions so do not attempt to establish a secure session.

The second section 510 of the secure provisioning manifest 250 includes a list of peripherals that are authorized to be connected to the transaction computer 30. Any peripheral attached to the transaction computer 30 that is not listed in this section of the secure provisioning manifest 250 is not authorized to be attached to the transaction computer 30 and the secure I/O module 230 will not communicate with it. The operating system 215 may still be able to communicate with the peripheral in some situations. However, the secure I/O module 230 will not communicate with the peripheral and will send an alert or error report to the enterprise provisioning server 20 listing any acquired information about the unauthorized peripheral. A policy record can be included with a rule that determines what action the secure I/O module 230 should take when an unauthorized peripheral is found. The rule may cause the secure I/O module 230 to shut down the transaction computer 30 or it may allow normal operations of the peripheral if it is considered a legacy peripheral.

The second section 510, as depicted in this example, has information on five peripherals. The record for each peripheral includes information 515 unique to each peripheral. The information 515 includes an item identification, a public key associated with the peripheral, a vendor identification, a vendor product identification, a vendor serial number and a reference to the policy records that should be applied to this peripheral. The public key is a cryptographic key associated with a private key where both keys are associated with the peripheral. The private key is stored in the peripheral. The secure I/O module 230 uses the public key to encrypt and decrypt secure data sent to and received from the peripheral over a secure session with the peripheral.

In some embodiments, the vendor serial number may include a range of serial numbers instead of a single serial number. When a range is specified, a peripheral will be authenticated if the serial number for the peripheral falls within the specified range. Using a range of serial numbers allows a customer that operates a number of transaction computers 30 to replace a peripheral in one transaction computer with a similar model peripheral from another transaction computer or to use a spare without having to call and wait for a customer service person to arrive and perform a peripheral update. A typical customer might want to do this if a peripheral failed.

The peripheral's public key and private key form a unique public/private key pair that has been generated and associated with the peripheral. In some embodiments, the key pair is generated and the private key is injected or stored in the peripheral's long term memory at some point during the process of manufacturing the peripheral. The public key is provided with the peripheral but not stored in the memory of the peripheral. When the peripheral is registered with the transaction system 10, information about the peripheral including the vendor's model number, the vendor's serial number, the vendor's product identification and the public key are sent to the enterprise provisioning server 20 and stored in a database of registered peripherals.

After the peripheral has been registered, the peripheral is attached to the transaction computer 30 either during the manufacture of the transaction computer 30 or during a field upgrade or replacement process performed on the transaction computer 30. An authorized person then identifies the peripheral and the transaction computer 30 to the enterprise provisioning server 20 and informs the enterprise provisioning server 20 that the peripheral has been attached to the transaction computer 30. The enterprise provisioning server 20 then retrieves information about the peripheral from the database of registered peripherals and retrieves a copy of the current secure provisioning manifest 250 for the transaction computer 30 from a database of registered transaction computers. The enterprise provisioning server 20 adds a new record to the second section 510 of the retrieved version of the secure provisioning manifest 250 for the transaction computer 30 and further adds a policy record if needed. The new record includes the information from the peripheral database that uniquely identifies the peripheral. The updated version of the secure provisioning manifest 250 is then encrypted using the public key associated with the secure I/O module 230 and transmitted to the transaction computer 30. The enterprise provisioning server 20 replaces the old version of the secure provisioning manifest 250 stored in the database of registered transaction computers and associated with the transaction computer 30 with the updated version of the secure provisioning manifest 250. Once the secure I/O module 230 receives the updated secure provisioning manifest 250 and authenticates it, the secure I/O module 230 will recognize the newly attached peripheral and authorize communications with it.

Figure 6:
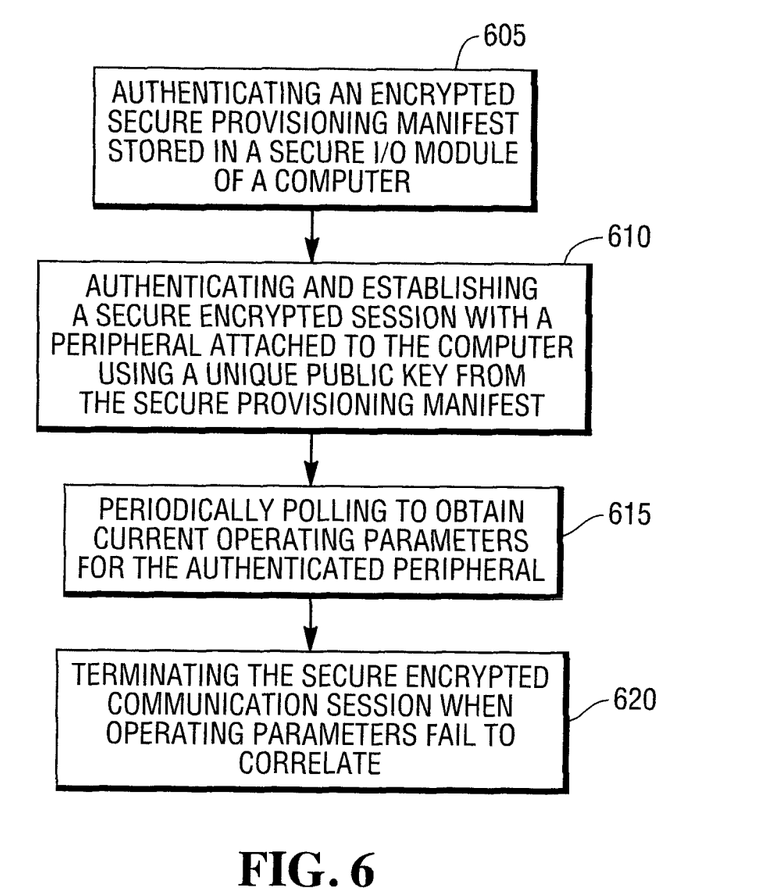
FIG. 6 is a high-level flow diagram illustrating a method of operating a secure I/O module using a secure provisioning manifest and operating parameters of a peripheral.

Turning to FIG. 6, there is provided a high-level flow diagram illustrating a method of operating the secure I/O module 230 using the secure provisioning manifest 250 to authenticate and communicate with peripherals 260 attached to the transaction computer 30 and using operating parameters to withdraw authentication and terminate communications with one of the peripherals 260 when it is determined that a security threat exists.

In step 605, the secure I/O module 230 authenticates the secure provisioning manifest 250 stored in the memory 315 of the secure processing module 255. The secure provisioning manifest 250 has been encrypted using the secure I/O module's 230 public key. Only the secure I/O module's 230 private key can successfully decrypt the encrypted secure provisioning manifest 250. The secure I/O module performs a decrypt operation on the encrypted secure provisioning manifest 250 using the private key 245 stored in the memory 315. The secure provisioning manifest 250 is authenticated if the decrypt operation successfully generates a proper clear text version of the secure provisioning manifest 250. The secure I/O module 230 can determine if the decrypt operation was successful by calculating a checksum for the decrypted version secure provisioning manifest 250 and comparing it to a checksum stored in the secure provisioning manifest 250. If they match, the decrypt operation was successful. If the decrypt operation is not successful, the secure I/O module 230 transmits an error report to the enterprise provisioning server 20. In some embodiments, the secure I/O module 230 will also stop the transaction computer 30 from performing any transactions until a new secure provisioning manifest 250 is received and authenticated.

In step 610, the secure I/O module 230 authenticates and establishes an encrypted communication session with a peripheral attached to the transaction computer 30 using a unique public key from the secure provisioning manifest. The secure I/O module 230 polls a peripheral attached to the transaction computer 30 and obtains information that uniquely identifies the peripheral. The information includes vendor identification, a vendor product identification and a vendor serial number for the peripheral.

The secure I/O module 230 compares the information received from the polled peripheral with peripheral information stored in the secure provisioning manifest 250. If there is a match, the peripheral is authenticated. An authenticated peripheral is authorized to be attached to the transaction computer 30 and the transaction computer 30 is authorized to communicate secure information with the peripheral. If no match is found, the peripheral is not authenticated and the secure I/O module 230 will not communicate with the peripheral and will not establish a secure session with the peripheral. The secure I/O module 230 also transmits an error report to the enterprise provisioning server 20 identifying the peripheral, the fact that it was not authenticated and other information identifying the secure I/O module 230 and the transaction computer 30.

The secure I/O module 230 establishes a secure encrypted communication session with the attached peripheral, if the peripheral was authenticated. The secure I/O module 230 uses the public key for the authenticated peripheral stored in the secure provisioning manifest 250 to encrypt data sent to the peripheral and to decrypt data received from the peripheral.

In step 615, the secure I/O module 230 periodically polls the authenticated peripheral and components within transaction computer 30 to obtain current values for operating parameters for the authenticated peripheral. Certain operating parameters are maintained or only available from the authenticated peripheral so current values or these operating parameters must be periodically received from the authenticated peripheral using the secure encrypted communication session. These operating parameters include but are not limited to: total power-on time for the authenticated peripheral; checksums for allocated memory and un-allocated memory, the checksums are generated on request; the total number of secure messages sent and received by the authenticated peripheral; the total number of successful reads of a magnetic stripe; and the total number of unsuccessful reads of a magnetic stripe.

Certain other operating parameters are measured by local components within the transaction computer 30 and current values for these operating parameters are read from these local components. These operating parameters include but are not limited to: electric current being used to power the authenticated peripheral as measured by the USB controller 275; and the number of electrical loads on the USB bus 260 used by the authenticated peripheral to communicate with the transaction computer 30. The USB controller 275 also measures the electrical load on the data bus of the USB bus 260.

The secure I/O module 230 maintains known values for all the operating parameters. Some of the operating parameters are fixed for a given peripheral. Examples of fixed operating parameters are the checksums for allocated and un-allocated memory of the peripheral. The known total power on time operating parameter is maintained for each peripheral by keeping a running total of the time each peripheral has been attached to the transaction computer 30 and the transaction computer 30 has been powered on. The first time a peripheral is attached to the transaction computer 30, the value of the current power-on time is read from the peripheral and added to the known power-on time for that peripheral. For other operating parameters such as the electrical loads and electric current, the secure I/O module 230 monitors the current values for each parameter for a short period after the peripheral is first attached and authenticated to determine a known value for each parameter that will correlate to the current values. For operating parameters that count events such as secure messages sent to or received from the peripheral and magnetic stripe read events, the secure I/O module 230 maintains counts that represent the known values for each operating parameter for each peripheral that performs these functions. Peripherals that can read magnetic stripe data, report good and bad operations to the secure I/O module 230 as they occur.

In step 620, the secure I/O module 230 terminates the secure encrypted communication session with the peripheral and withdraws the authentication for the peripheral when one or more of the current operating parameters fails to correlate with corresponding known values for the operating parameters. During each of the periodic polling cycles, the secure I/O module 230 determines for each of the operating parameters whether or not the current value correlates to the known value. The correlation may require an exact match of current and known values, such as for the checksum and count based parameters or that the current value is within a small range around the known value such as with the electric current parameter. If all operating parameters correlate, the normal operations continue.

Although the present invention has been described with particular reference to certain preferred embodiments thereof, variations and modifications of the present invention can be effected within the spirit and scope of the following claims.

What is claimed is:

1. A method implemented by a secure I/O module of a computer, the computer includes a main processor that executes an operating system but cannot access elements within the secure I/O module, the method comprising:
   determining that the secure I/O module is authorized to communicate with a peripheral attached to the computer using a secure provisioning manifest stored in the secure I/O module, wherein determining further includes processing the secure I/O module independent of the operating system, the operating system has no driver for or control over the secure I/O module, wherein the operating system and the secure I/O module reside on a same motherboard as one another and the secure I/O module includes a different processor from the main processor and the secure I/O module further includes separate network hardware and software not available to the operating system for communication with remote computers over a network and processes communication over a different path within the motherboard when communicating over the network from an operating system communication path processed by the operating system
   authenticating the peripheral using information from the secure provisioning manifest;
   establishing a secure encrypted communication session with the authenticated peripheral, wherein the operating system has no control over the secure encrypted communication system;
   polling periodically following initial authentication of the peripheral to obtain current operating parameters for the authenticated peripheral; and
   terminating the secure encrypted communication session and withdrawing authentication for the peripheral when one or more of the current operating parameters for the peripheral fails to correlate with corresponding known operating parameters for peripheral.

2. The method of claim 1, wherein establishing a secure encrypted communication session further comprises receiving encrypted data using the secure encrypted communications session that can only be decrypted by the secure I/O module and not by the operating system.

3. The method of claim 1, wherein polling periodically further comprises using the secure encrypted communication session to obtain the portion of the current operating parameters maintained by the authenticated peripheral.

4. The method of claim 1, wherein the operating parameters include a total power-on time for the authenticated peripheral and wherein the correlation fails when the absolute difference between the value for the current total power-on time and the value for a known total power-on time is greater than a predetermined time-on value.

5. The method of claim 4, wherein the predetermined time-on value is generally equal to the polling period used to obtain the current operating parameters.

6. The method of claim 1, wherein the operating parameters include at least one checksum value for allocated memory and a checksum value for un-allocated memory of the authenticated peripheral and wherein the correlation fails when any of the current checksum values from the authenticated peripheral do not match corresponding known checksum values stored in the secure provisioning manifest for the authenticated peripheral.

7. The method of claim 1, wherein the operating parameters include a value for the total number of secure messages sent and received by the authenticated peripheral using the secure encrypted communication session and wherein the correlation fails when the current value for the total number of secure messages sent and received by the authenticated peripheral does not match a known value maintained by the secure module for the total number of secure messages sent to and received from the authenticated peripheral using the secure encrypted communication session.

8. The method of claim 1, wherein the operating parameters include a value for the electric current used to power the authenticated peripheral and wherein the correlation fails when the current value for the electric current varies by more than a predetermined value from a known electric current value.

9. The method of claim 1, wherein the operating parameters include a value for the total number of successful reads of a magnetic stripe and a value for the total number of unsuccessful reads of a magnetic stripe by the authenticated peripheral and wherein the correlation fails when either of the current read values do not match corresponding known read values maintained by the secure I/O module.

10. The method of claim 1, wherein the operating parameters include a value for the number of electrical loads on a USB bus used for communications between the computer and the authenticated peripheral and wherein the correlation fails when the current value for the number of electrical loads does not match the value for a known number of electrical loads for the authenticated peripheral.

11. A computer comprising:
    a main processor configured to execute an operating system of a motherboard for the computer; and
    a secure I/O module of the motherboard, the secure I/O module including a processor that is different from the main processor, and the secure I/O module including separate network hardware and software not available to the operating system to communicate with remote computers over a network and the secure I/O module to communicate over a different path within the motherboard when communicating over the network from an operating system communication path processed by the operating system, and the processor of the secure I/O module adapted to execute computer instructions that when executed by the processor cause the processor to:
    communicate with the main processor and a peripheral connected to the computer independent of the operating system and without control of the operating system;
    determine that information received from the peripheral matches information stored in the secure provisioning manifest;
    use a secure provisioning manifest to authenticate and establish a secure encrypted communication session with the peripheral in response to the information received from the peripheral matching the information stored in the secure provisioning manifest, the operating system having no control over the secure encrypted communication session;
    poll periodically following initial authentication of the peripheral to obtain current operating parameters for the authenticated peripheral where communications with the authenticated peripheral to obtain current operating parameters maintained by the authenticated peripheral use the secure encrypted communication session; and terminate the secure encrypted communication session and withdraw authentication for the peripheral if one or more of the current operating parameters of the peripheral fails to correlate with corresponding known operating parameters for peripheral.

12. The computer of claim 11, where the processor of the secure I/O module is further adapted to generate a logical peripheral interface that uses the secure encrypted session to communicate with the peripheral and where the operating system executed by the main processor causes the main processor to use the logical peripheral interface to control and communicate with the peripheral.

13. The computer of claim 11, where the processor of the secure I/O module is further adapted to store one or more of the obtained current operating parameters as the known operating parameters for the authenticated peripheral if the correlation passes.

14. The computer of claim 11, where the operating parameters include a total power-on time for the authenticated peripheral and where the correlation fails when the absolute difference between the value for the current total power-on time and the value for a known total power-on time is greater than a predetermined time-on value.

15. The computer of claim 14, where the predetermined time-on value is generally equal to the polling period used to obtain current operating parameters.

16. The computer of claim 11, where the operating parameters include at least one checksum value for allocated memory and a checksum value for un-allocated memory of the authenticated peripheral and where the correlation fails when any of the current checksum values from the authenticated peripheral do not match corresponding known checksum values stored in the secure provisioning manifest for the authenticated peripheral.

17. The computer of claim 11, where the operating parameters include a value for the total number of secure messages sent and received by the authenticated peripheral using the secure encrypted session and where the correlation fails when the current value for the total number of secure messages sent and received by the authenticated peripheral does not match a known value maintained by the secure I/O module for the total number of secure messages sent to and received from the authenticated peripheral using the secure encrypted session.

18. The computer of claim 11, where the operating parameters include a value for the electric current used to power the authenticated peripheral and where the correlation fails when the current value for the electric current varies by more than a predetermined value from a known electric current value.

19. The computer of claim 11, where the operating parameters include a value for the total number of successful reads of a magnetic stripe and a value for the total number of unsuccessful reads of a magnetic stripe by the authenticated peripheral and where the correlation fails when the either current read values do not match corresponding known values maintained by the secure I/O module.

20. The computer of claim 11, where the operating parameters include a value for the number of electrical loads on a USB bus used for communications between the computer and the authenticated peripheral and where the correlation fails when the current value for the number of electrical loads does not match the value for a known number of electrical loads for the authenticated peripheral.

* * * * *